United States Patent [19]

Pizzino et al.

[11] Patent Number: 5,102,550
[45] Date of Patent: Apr. 7, 1992

[54] APPARATUS AND PROCESS FOR DESALINATION OF SEAWATER

[75] Inventors: Joseph F. Pizzino, Gambrills; David B. Patchett, Annapolis, both of Md.

[73] Assignee: The United States of America as represented by the Secretary of the Navy, Washington, D.C.

[21] Appl. No.: 607,936

[22] Filed: Nov. 1, 1990

[51] Int. Cl.⁵ ............................................. B01D 15/00
[52] U.S. Cl. .................................... 210/640; 210/651; 210/653; 210/654; 210/321.78; 210/321.87; 210/323.2
[58] Field of Search ............. 210/640, 651, 650, 653, 210/500.27, 500.21, 500.41, 652, 323.2, 321.8, 321.89; 203/10; 202/180, 163, 172; 55/16

[56] References Cited

U.S. PATENT DOCUMENTS

| | | | |
|---|---|---|---|
| 4,476,024 | 10/1984 | Cheng | 210/640 |
| 4,545,862 | 11/1985 | Gore et al. | 203/10 |
| 4,583,996 | 4/1986 | Sakata et al. | 55/16 |
| 4,718,837 | 11/1988 | Lefebvre | 210/640 |
| 4,718,985 | 1/1988 | Kjellander et al. | 202/172 |
| 4,728,397 | 3/1988 | Kjellander et al. | 202/180 |
| 4,818,345 | 4/1989 | Jönsson | 202/163 |
| 4,879,041 | 11/1989 | Kurokawa et al. | 210/640 |

FOREIGN PATENT DOCUMENTS

2140694 6/1987 Japan .................................... 210/640

*Primary Examiner*—Robert A. Dawson
*Assistant Examiner*—Ana Fortuna
*Attorney, Agent, or Firm*—Luther A. Marsh; Howard Kaiser; John Stowe

[57] ABSTRACT

An apparatus and process for desalination of seawater using a hydrophobic vapor permeable membrane. Heated seawater is passed across one surface of a membrane at rates which cause the flow to be turbid such that its turbidity is characterized by Reynolds numbers in excess of 1000. Fresh water is passed across the other surface of the membrane to act as a condenser and collector of vapor which passes through the membrane.

19 Claims, 5 Drawing Sheets

APPARATUS AND PROCESS FOR DESALINATION OF SEAWATER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a process for desalination or de-salting of seawater and more specifically by use of hydrophobic porous membranes in conjunction with non laminar flow.

2. Background Information

The need for the separation of fresh water from seawater and numerous processes and apparatus for accomplishing this task are well known. The separation of water vapor and its condensation into water by means of hydrophobic membrane are also known.

One example of an apparatus for carrying out such a process is disclosed in U.S. Pat. No. 4,545,862 to Gore. In Gore, a membrane distillation module is provided with a thin flexible microporous membrane positioned against an impermeable condenser sheet that is stiffer in bending than the membrane. Distillate vapor diffuses through the membrane from the hot feed flowing rapidly past the membrane, and condenses and collects there between, and in intimate contact with the membrane and the condenser sheet. The collector sheet is thin such as on the order of 0.001 to 0.005 inches. The collector sheet is positioned adjacent to the membrane such that condensing vapor is separated from the heated seawater when distillate begins to form. Cooling fluid is provided on the side of the impermeable membrane opposite to the collection space between the membrane and the collector. As sea water flows by the thin membrane, and undulating force tends to move the distillate toward an outlet. Another similar form of distillation apparatus using a hydrophobic porous membrane is shown in U.S. Pat. No. 4,818,345 to Jonsson. Jonsson also uses a hydrophobic membrane and a condenser sheet with a defined air gap between membrane and condenser. A flow of air through the air gap acts to strip the distillate from the air gap volume. The air gap between membrane and condenser is in the range of 0.2 mm to 1.0 mm. Another embodiment of distillate chamber type of desalination device is illustrated in U.S. Pat. No. 4,718,985 to Kjellander. The apparatus of Kjellander is characterized in that the membrane through which the saltwater flows, the condenser surface, and the chamber through which cooling water flows are all coaxial. Consequently the collection chamber or air gap volume is also coaxial. Again an air flow through the collection chamber removes the distillate. In each of the above patents, there is a common element of a defined space between a vapor permeable membrane and a condenser wall separating the distillate from a cooling fluid. As pointed out in Gore, a thin air gap between membrane and condenser tends to limit the rate at which distillate can be extracted and a large air gap between membrane and condenser would tend to limit productivity.

There is a need for a membrane distillation process that will provide for rapid removal of distillate without limiting productivity.

SUMMARY OF THE INVENTION

The present invention is an apparatus and process for obtaining fresh water from seawater. A membrane distillation module further comprises a shell having a saline inlet port, a saline outlet port, a fresh water inlet port and a fresh water outlet port. The fresh water ports are fluidly isolated from the saline ports by at least one tubular vapor permeable porous hydrophobic membrane. Heated seawater is moved through the interior surface of each tubular membrane at a rate which exceeds laminar flow corresponding to a Reynolds number in excess of 1000. Cooler fresh water is moved adjacent the exterior of the tubular membrane acting to condense and collect water vapor that passes through the permeable membrane. Preferably, the flow corresponds to a Reynolds number of at least 2000 and more preferably corresponds to a Reynolds number in the range of 2000 to 5000. The preferable material for the membrane is expanded porous polytetrafluoroethelene which preferably has a maximum membrane pore size within the range of 2.0 to 3.5 microns. In one embodiment, the flow arrangement is such that the flow directions of said seawater and said fresh water are in the same direction along their respective surfaces of membrane and in another embodiment, the flow direction of the seawater is opposite the flow direction of the freshwater along the surfaces of said membrane.

The advantages of the process are not limited to the use of tubular membranes. It is believed that the process applies equally as well to any membrane configuration where turbulent flow corresponding to a Reynolds number in excess of 1000 can be achieved. Preferably, the seawater is heated to a temperature in the range of 150 to 210 degrees F., with performance increasing at the higher temperature. In accordance with one embodiment of the invention described herein, the seawater is heated to a temperature in the range of 190 to 200 degrees F.

The pressure difference between said freshwater and said seawater is maintained in the range of $-1.0$ psi to $+1.0$ psi. The flow within the system is arranged with heat exchangers so that heat is exchanged for thermal efficiency.

In the membrane distillation module, a component of the system, the exterior of each hydrophobic tube is sealed along a portion of the tube length so as to fluidly isolate the distilland ports from the distillate ports.

An apparatus in accordance with the present invention offers advantages in terms of performance, reliability and maintainability which are not available in the prior art. Performance is increased by operation of the system at a high Reynolds number in combination with a high temperature differential across the membrane. Maintainability is improved because the construction of the membrane distillation module allows the module to be easily changed out should it become unserviceable. Reliability is increased because the separate condenser and thru air space associated with membrane distillers of the prior art have been eliminated.

Other objects, advantages and novel features of this invention will become apparent from the following detailed description of the invention when considered in conjunction with the accompanying drawings.

DETAILED DESCRIPTION OF INVENTION

Figure 1:
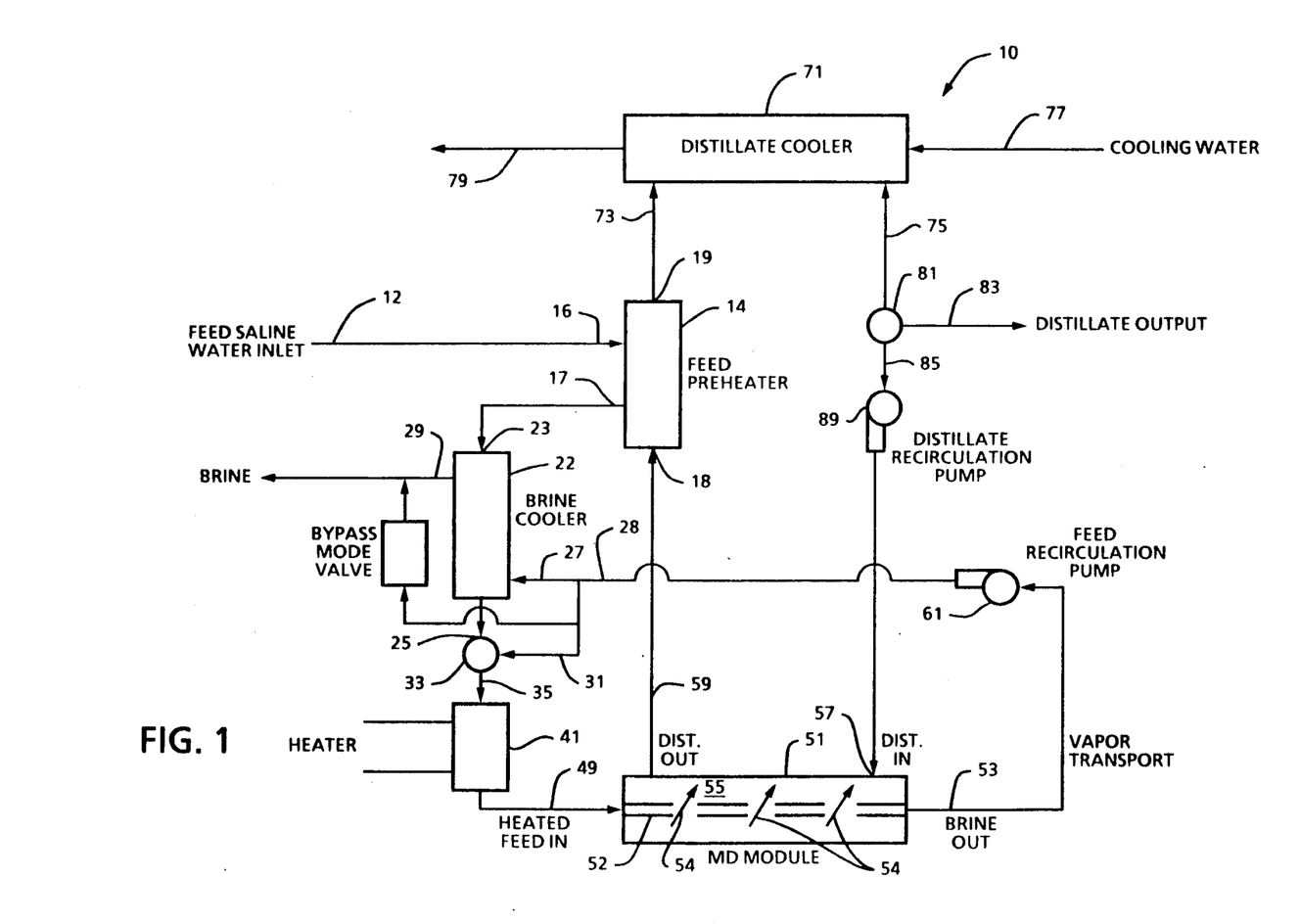
FIG. 1 is a functional block diagram showing the system of the present invention.

Referring now to FIG. 1, the preferred embodiment of an apparatus for carrying out a saltwater distillation process in accordance with the present invention is illustrated generally as 10. Saline or saltwater is introduced into the system at inlet 12 from a source such as storage tank or the open ocean. Depending on the level of the system with respect to the hydrostatic head of the saltwater, it may be necessary that inlet 12 be force fed by means of a pump (not shown). Input seawater is passed through feed preheater 14 in the direction from preheater 14 inlet 16 to outlet 17. Feed preheater 14 has distillate inlet 18 and distillate outlet 19. Distillate inlet fluidly communicates with distillate outlet 19 but neither inlet 18 nor outlet 19 are in fluid communication with either saltwater inlet 16 or saltwater outlet 17. Saltwater flowing from inlet 16 to outlet 17 is in thermal communication with distillate flowing from inlet 18 to outlet 19. Normal operating conditions are that the saltwater temperature at 16 is expected to be lower than the distillate temperature at 18 so that saltwater at 17 is warmer than saltwater at 16.

Feed saltwater at outlet 17 enters brine cooler 22 at inlet 23. The purpose of brine cooler 22 is to recoup energy from a portion of the spent brine before the brine is discharged into the ocean. In the process, the energy is transferred to the saltwater feedwater so that the saltwater temperature at brine cooler outlet 25 is higher than the saltwater temperature at brine cooler inlet 23. Brine cooler 22 has a brine inlet 27 and a brine outlet 29 so that normal flow of brine through brine cooler 22 is from inlet 27 to outlet 29. Within brine cooler 228 saltwater inlet 23 is fluidly connected with saltwater outlet 25 and brine inlet 27 is fluidly connected with brine outlet 29. Seawater inlet 23 and seawater outlet 25 are fluidly isolated from brine inlet 27 and brine outlet 29. Seawater flowing from inlet 23 to outlet 25 is in thermal communication with brine flowing from brine inlet 27 to brine outlet 29. It is generally expected that the brine temperature at outlet 29 will be lower than the brine temperature at inlet 27 and the seawater temperature at 25 will be higher than the seawater temperature at 23.

Brine entering at 27 is a predetermined portion of brine available in conduit 28. Brine at 28 is divided so that a portion of brine at 28 bypasses brine cooler 22 along conduit 31 and mixes with feed seawater from outlet 25 in a mixing chamber at 33. Thus, feedwater at conduit 35 is a mixture of inlet saltwater and brine, the term brine being used to designate a liquid from which distillate has been extracted so that it is normally expected the salt concentration of brine will be higher than the salt concentration of the seawater. A mixture of seawater and brine in conduit 35 flows through heater 41 where additional energy is added before the heated feed is introduced into Membrane Distillation (MD) module 51 at inlet 49. As heated feedwater passes through MD module 51 from inlet 49 to outlet 53 a portion of the heated feed passes through membrane 52 by vapor transport as indicated schematically by arrows 54. Vapor in the zone 55 near the surface of membrane 52 mixes with distillate (DIST) recirculated through vapor transport zone 55 by introducing distillate at inlet 57 and extracting distillate at outlet 59. Heated distillate at 59 flows into inlet 18 of feed pre-heater 14 where energy is extracted from the distillate.

Brine at outlet 53 is recirculated into conduit 28 by means of feed recirculation pump 61. Feed recirculation pump 61 is driven by conventional means such as for example an electric motor (not shown). Distillate at outlet 59 carries accumulated thermal energy which it exchanges to feed saltwater in feed preheater 14 as discussed above. Partially cooled distillate at feed preheater outlet 19 flows into heat exchanger 71 at inlet 73 and fluidly communicates with distillate cooler outlet 75.

Cooling water is provided into distillate cooler 71 at inlet 77 and flows through cooler 71 to discharge as indicated at 79. Cooling water from inlet 77 fluidly communicates with outlet 79 and thermally but not fluidly communicates with distillate flowing from inlet 73 to outlet 75. Distillate at 75 is divided into a recirculated portion in conduit 85 and an output portion in conduit 83 by suitable means such as for example proportioning valve 81. The distillate output in conduit 83 is the useful product and is discharged into a reservoir, holding tank or piping system (not shown). Proportioning valve 81 divides the distillate according to a predetermined value. Distillate recirculation pump 89 provides hydrostatic pressure for recirculating distillate through a loop indicated by numerals 57, 59, 18, 19, 73, 75 and 85 in sequence. Preferably distillate pump 89 and feed recirculation pump 61 are variable capacity devices which operate under the influence of a control system for controlling the relative rates of flow of distillate and feed water through MD module 51.

Figure 3:
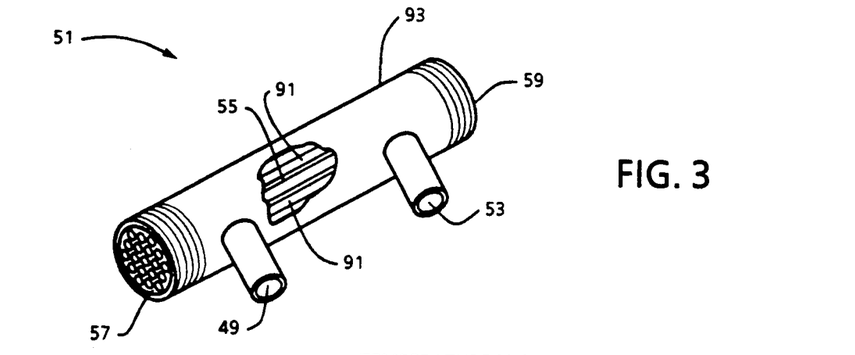
FIG. 3 is a membrane distillation module adapted for threaded connection into a distillation system.

The performance characteristics of the present invention are demonstrated by reference to an embodiment of MD module 51 which was built and tested. Referring now to FIG. 3, membrane distillation module 51 was constructed with a shell 93 and a plurality of tubes 91. Shell 93 was made with an internal diameter of about 13/16 inch (about 2 cm) with a wall thickness of about ⅛ inch (about 3.2 mm) having a burst pressure above 80 psi (about 5.4 bar) for temperature below 210° F.

Figure 2:
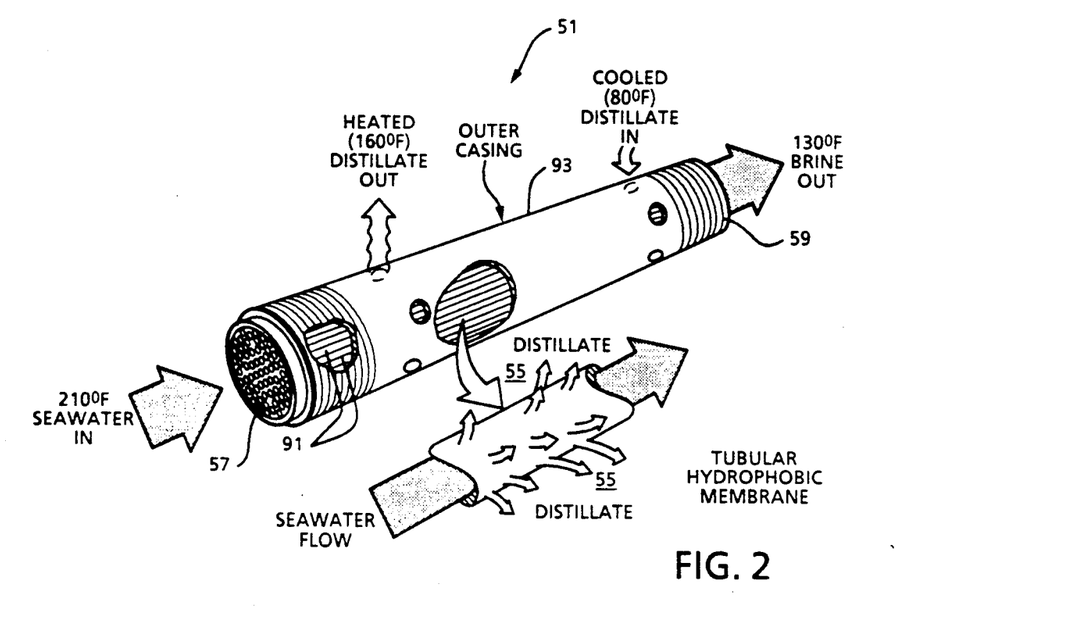
FIG. 2 is functional diagram of the operation of the membrane distillation module portion of the system.

Referring now to FIG. 2, the preferred embodiment of MD module 51 is functionally illustrated. In the preferred embodiment, the membrane module is fabricated along the lines of a shell and tube heat exchanger module where the function of a vapor permeable hydrophobic membrane is accomplished by a plurality of tubes 91 enclosed within a shell 93. Each tube 91 is sealed from each other tube 91 at both inlet end 49 and outlet end 53.

Shell 93 is adapted with inlet 57 and outlet 59 so that distillate fluid flows through vapor transport zone 55. Vapor transport zone 55 refers to the space adjacent to each tube. The apparatus described herein is used to carry out a novel process wherein it has been discovered that the performance of membrane distillation of seawater is greatly increased by controlling the rate at which recirculated distillate flows adjacent to heated feed water when the two liquids are separated by a hydrophobic vapor permeable membrane. The performance is determined by the Reynolds number associated with the flow of the distilland. Preferably the flow of the distilland is characterized by a Reynolds number in excess of 1000 and most preferably a Reynolds number within the range of 2000 to 5000.

Material for shell 93 was polysulfone (purchased from Sani-Tech Corporation). Tubes 91 were fabricated from lengths of expanded porous polytetrafluoroethylene (PTFE) tubing purchased from William Gore & Associates, Inc., Newark, Del. Manufacture of such material is described in U.S. Pat. Nos. 3,953,566 and 4,187,390.

Generally, the flows through the complete system are readily understood from the foregoing description presented in association with FIG. 1. However, in order to fully appreciate the apparatus and process of the present invention, it is necessary to look at a more detailed description of MD module 51 and the results of tests obtained from fabricated MD modules. The preferred embodiment of the MD module is analogous to a single-pass shell-and-tube heat exchanger in which the heat transfer tubes have been replaced by tubular PTFE hydrophobic membranes. The membrane tubes allow the passage of water vapor to the exclusion of the seawater. As heated seawater flows through the module, a portion of it vaporizes, passes through the membrane wall, and is condensed by direct contact with distillate flowing on the opposite side of the membrane. The driving force in the MD process is the vapor pressure difference between the heated seawater and the lower-temperature distillate. This driving force results in an overall net mass flow of vapor from the seawater through the membrane to the distillate. The outer casing of the module is made of polysulfone, and the PTFE membrane tubes are secured in an epoxy tube sheet. The module as constructed was about 15½ inches (about 39 cm) long and 1 inch (about 2.5 cm) in outer diameter (13/16 inch in inner diameter), resulting in an effective length-to-diameter ratio of about 19.

The performance, i.e. distillate rate, of the MD system is directly influenced by the vapor pressure difference across the membrane, the membrane area, and the ability of the membrane to transmit water vapor. The distillate rate (DR) can, therefore, be characterized by the following equation:

$$DR = K \cdot Am \cdot LMVPD \qquad (1)$$

where K is the overall mass transfer coefficient of the membrane, $A_m$ is the membrane area of the system or module, and LMVPD is the log mean vapor pressure difference between the distillate and seawater streams. This equation is similar to the heat transfer equation $Q = U \cdot A_s \cdot LMTD$ where U, the overall heat transfer coefficient, is analogous to K. The value of K is believed to be dependent on several parameters: (1) the membrane permeability, $D_p$(gal/ft$^2$-sec), which represents the intrinsic ability of the membrane to transfer water vapor and which remains constant for a given membrane regardless of the operating conditions, (2) the resistance to mass transfer caused by thermal gradients and concentration gradients resulting from flow conditions, (3) tube packing density, which affects flow conditions, (4) tube diameter, and (5) possibly the flow arrangement within the module. The value for K was calculated for each parametric test as $$K = \text{distillate flux}/LMVPD \text{ (gpd/ft}^2\text{-psi)} \qquad (2)$$

The overall mass transfer coefficient, K, is a normalized distillate flux, which for analysis was assumed to be independent of temperature therefore can be used to evaluate the effect of each parameter on membrane performance. Once an optimal value for K is obtained, that value can be substituted in Equation (1) to estimate total membrane area required for a specific desalination plant freshwater capacity (DR) under any operational conditions. To convert to metric equivalents, multiply gpd/ft$^2$ by 1.6977 to obtain kg/hr-m$^2$ and divide psi by 14.7 to obtain pressure in bars.

The LMVPD is the average vapor pressure difference between the heated feed seawater and the cooler distillate streams and can be calculated by the following equation:

$$LMVPD = \frac{(VP_{swi} - VP_{do}) - (VP_{swo} - VP_{di})}{\text{Ln}\,((VP_{swi} - VP_{do})/(VP_{swo} - VP_{di}))} \qquad (3)$$

where:
$VP_{swi}$ = Vapor pressure of the seawater entering the module.
$VP_{swo}$ = Vapor pressure of the seawater brine exiting the module.
$VP_{di}$ = Vapor pressure of the distillate entering the module.
$VP_{do}$ = Vapor pressure of the distillate existing the module.

The vapor pressure of seawater can be calculated using the following relationship provided in the Harwell, *Heat Transfer and Fluid Flow Service Handbook*, Vol. 2, Chalk River Nuclear Laboratory, Ontario Canada (Feb 1987)

$$VF_s = \frac{e^{(A + B/(C+T) + D \cdot LnT + E \cdot T)}}{F} \qquad (4)$$

where A = −722.144, B = 215522, C = 647.3, D = 86.8168, E = 0.0099534, F = 68.9473 and T is in degrees Kelvin. The vapor pressure of freshwater is also calculated using Equation (4) but must be corrected using the following equation:

$$VP_f = VP_s/(1 - 0.537 \cdot 10^{-6} S) \qquad (5)$$

where S is the salinity of seawater in parts per million of total dissolved solids.

A parametric study was conducted to determine the effects of selected membrane and system parameters on membrane performance. The various system parameters subject to variation are summarized in Table 1. In the discussion below, "flow arrangement" refers either to countercurrent (opposite direction) flow of the seawater and distillate streams or to cocurrent (same direction) flow of the seawater and distillate streams within the module. "Flow configuration" refers to either the flow of seawater through the membrane tubes or over the exterior surface of the tubes, i.e. on the shell side of the module. "Operating temperature" is defined as the seawater temperature entering the MD module, $T_{swi}$.

"Membrane porosity" is defined as the maximum pore size for a given membrane.

TABLE 1

Summary of Parameters

| MEMBRANE PARAMETERS | SYSTEM PARAMETERS |
|---|---|
| Membrane porosity | Re of the seawater flow rate |
| Membrane tube length | Re of the distillate flow rate |
| Membrane tube diameter | Operating temperature |
| Membrane tube packing density | Flow arrangement |
|  | Recovery rate |

The effects of membrane porosity, seawater flow rate through the membrane (Reynolds number), and flow arrangement on membrane performance were examined for the flow configuration of sea water flowing within the tubes.

One module tested contained 35 tubes of low porosity (2.0-$\mu$), 2-mm inner diameter, 15 ½ inch (about 39 cm) length PTFE membrane tubing. The module was tested with both countercurrent flow and cocurrent flow arrangements at flow rates ranging from laminar to turbulent flow. A second module tested contained 34 tubes of high porosity (3.5-$\mu$), 2 mm inner diameter, 15 ½ inch (about 39 cm) length PTFE membrane tubing. This module was also tested for both countercurrent flow and cocurrent flow arrangements at six flow rates. A flood test was also conducted to to observe membrane recovery after flooding. Flooding is a phenomenon which occurs when the "water entry pressure" has been exceeded. "Water entry pressure" is the pressure at which liquid water passes through the membrane. Flooding results in temporary increase of distillate salinity.

System temperatures and pressures were measured by Resistance Temperature Devices (RTDs) and Bourbon tubes gages, respectively. Seawater and distillate recirculation rates, distillate rate, and distillate quality data were collected using rotameters, a graduated cylinder and a conductivity meter, respectively. Each test lasted about 2 ½ hours with data being taken every 15 minutes. The data was then used to calculate K, as previously discussed, and a Reynolds number, which were then plotted to show their functional relationship. During these tests the temperature of the seawater input was maintained at about 190° to 200° F. (about 87°-93° C.).

Figure 4:
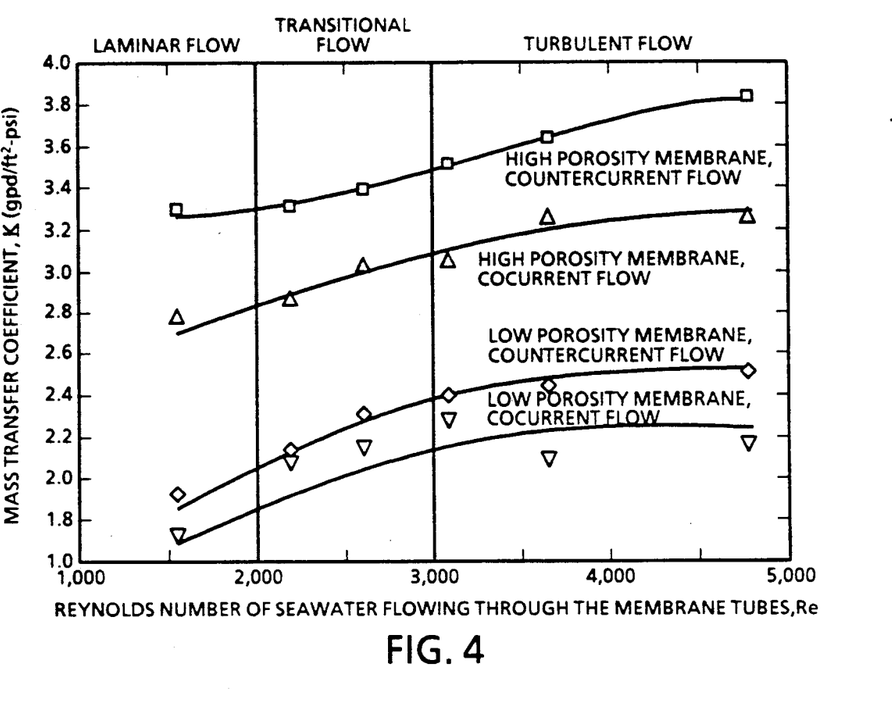
FIG. 4 is a graphical representation showing the effect of Reynolds number on the mass transfer coefficient.
Figure 5:
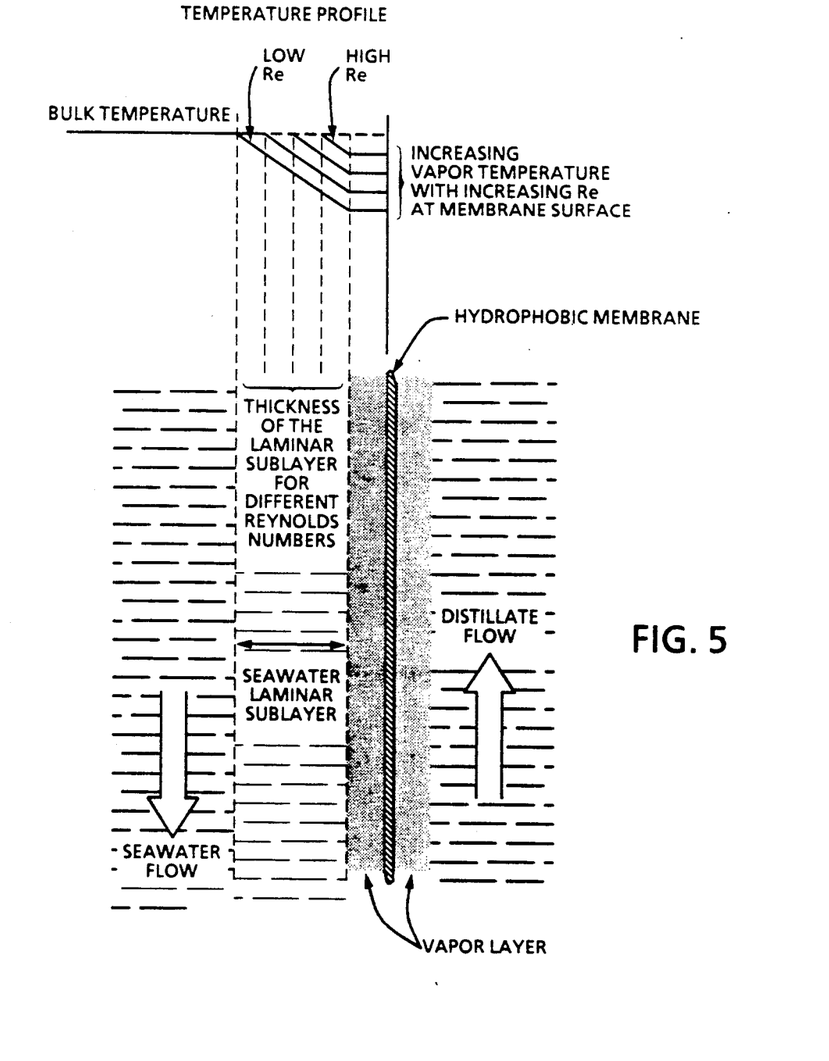
FIG. 5 is a graphical representation of flow variations for selected characteristics.

To evaluate the effect of flow rate on membrane performance, the MD system was operated at a number of flow rates corresponding to both laminar and turbulent flow regimes within the membrane tubes. This was accomplished for the following four operating conditions: (1) low porosity membrane and cocurrent flow arrangement, (2) low porosity membrane and countercurrent flow arrangement, (3) high porosity membrane and cocurrent flow arrangement, and (4) high porosity membrane and countercurrent flow arrangement. The results of these tests are shown in FIG. 4. For all four operating conditions the K values increased with increasing Reynolds number but tended to reach a plateau in the turbulent region. The improved membrane performance, i.e., the greater mass transfer rate, observed with increasing Reynolds number can be explained by the reduction in the thickness of the laminar sublayer adjacent to the seawater-to-vapor boundary; this is a result of the increasing turbulence. This is illustrated in FIG. 5. A higher turbulence, i.e., a higher Reynolds number, within the seawater flow channel tends to reduce the thickness of the laminar sublayer, which in turn results in a vapor temperature that is closer to the temperature of the bulk seawater stream.

The effect of flow arrangement can be seen by comparing the top two curves or the bottom two curves in FIG. 4. The data points for cocurrent flow lie consistently below those for countercurrent flow for both the low and high porosity membranes, even though there is some scatter. The overall mass transfer coefficient, K, was expected to be almost identical for the two flow arrangements. Although it is not entirely understood why the countercurrent flow arrangement resulted in higher K values, one possible explanation is that for countercurrent flow, the greater water pressure difference (between the feed seawater and recirculated distillate) may expand (balloon) the membrane, resulting in larger pores which subsequently allow for greater vapor transfer. Another possible explanation is that the mathematical model for the membrane distillation system, which is based upon the heat exchanger analogy, may not provide an accurate assessment of performance for both cocurrent and countercurrent flow arrangements. However, neglecting the possible improvement in K, one advantage of using a countercurrent flow arrangement is that a greater LMVPD can be achieved which will result in increased distillate rates for a given module. The disadvantage of the countercurrent flow arrangement is that it limits the module length. This is due to the nature of the pressure drop for the countercurrent flow arrangement, which is discussed more fully below.

Referring again to FIG. 4, the curves reveal that the high porosity membrane resulted in a dramatic increase in K for all Reynolds numbers compared with the low porosity membrane. The high porosity membrane had a maximum pore size of 3.5$\mu$ compared to 2$\mu$ for the low porosity membrane. The high porosity membrane, with its larger pore size, resulted in improved performance (greater vapor flow rate) by providing a lower resistance for vapor transfer. According to the membrane manufacturer, air permeability of the high porosity membrane is 60% greater than that of the lower porosity membrane, which is a further indication that the high porosity membrane possesses a lower resistance to vapor transport. The increased performance (vapor flow rate) demonstrated by the high porosity membrane was accompanied by a distillate salinity in the same range as that of the lower porosity membranes. The salinity (S) data in parts per million (ppm) for both the high and low porosity membranes and for both the countercurrent and cocurrent flow arrangements is summarized in Table 2 and related to flow rates characterized by the Reynolds Numbers (Re) shown.

TABLE 2

Salinity as Function Of Flow Arrangement and Reynolds Number

| HIGH POROSITY | | | | LOW POROSITY | | | |
|---|---|---|---|---|---|---|---|
| Cocurrent | | Countercurrent | | Cocurrent | | Countercurrent | |
| Re | S | Re | S | Re | S | Re | S |
| 1452 | 3.3 | 1637 | 2.3 | 1542 | 3.5 | 1628 | 2.9 |
| 2180 | 3.6 | 2106 | 1.4 | 2007 | 1.5 | 2612 | 2.0 |
| 2590 | 4.9 | 2616 | 1.2 | 2649 | 1.4 | 1947 | 1.8 |
| 3074 | 1.6 | 3095 | 1.2 | 3120 | 1.7 | 2979 | 1.5 |
| 3654 | 3.4 | 3827 | 2.9 | 3855 | 3.1 | 3865 | 1.6 |
| 4777 | 1.9 | 4719 | 7.6 | 4762 | 1.4 | 4593 | 4.5 |

For the high porosity membrane and a cocurrent flow arrangement all distillate salinity was measured as less than 5 ppm. For the high porosity membrane and a countercurrent flow arrangement, all distillate salinity data were measured as less than 3 ppm, except for the highest flow rate (highest Reynolds number), which produced 7.6 ppm distillate. The increase in distillate salinity to 7.6 ppm for the countercurrent flow arrangement at the highest flow rate did create some concern. This concern was subsequently addressed by the flood test, which was performed to observe the membrane behavior when the water entry pressure has been exceeded.

Figure 6A:
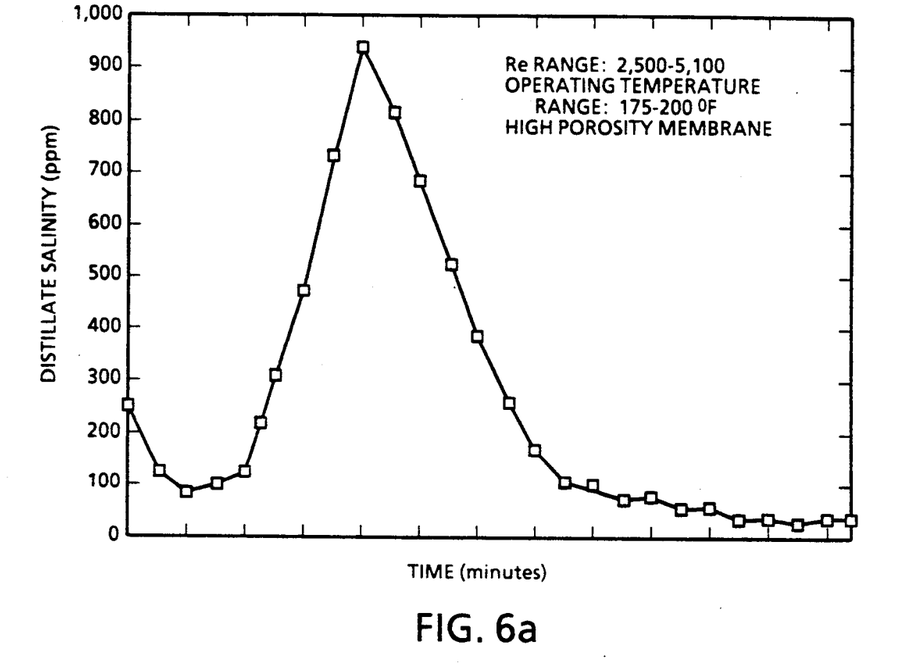
FIGS. 6(a) and 6(b) are graphs showing salinity resulting from membrane flooding.
Figure 6B:
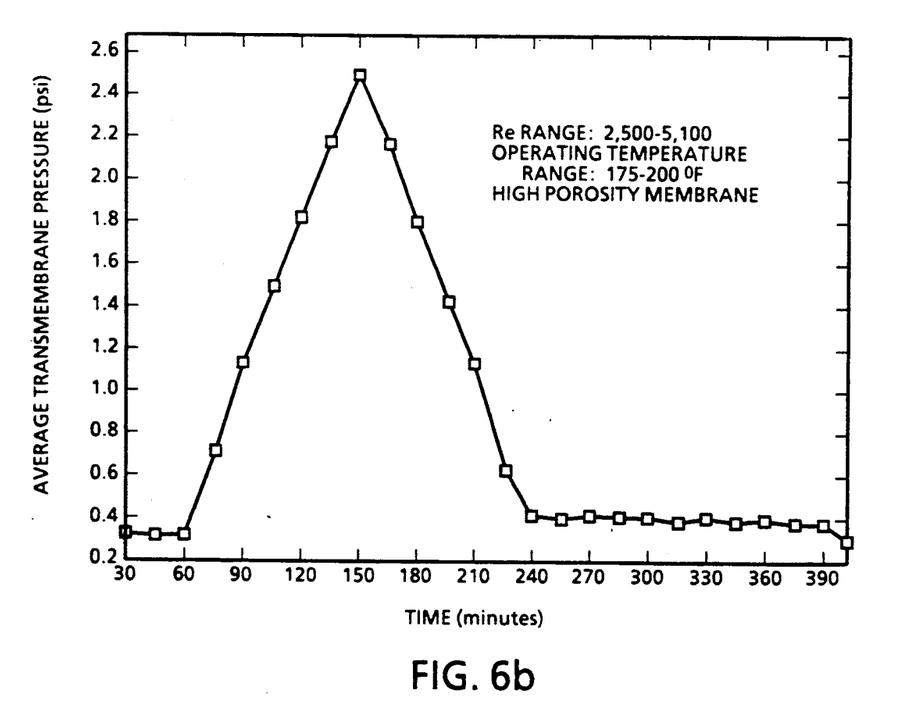

A flood test was performed using high porosity membrane and a cocurrent flow arrangement. To perform the test, the average transmembrane pressure, TMP, calculated as $$TMP = ((F_{pi} - D_{pi}) + (F_{po} - D_{po}))/2 \qquad (6)$$

was incrementally increased every 15 minutes until the distillate salinity increased significantly, indicating flooding, i.e., the passage of seawater through the membrane. After flooding occurred, the TMP was incrementally reduced every 15 minutes so that the subsequent membrane behavior could be observed. FIG. 6 is a plot of TMP and distillate water salinity vs. time for a high porosity membrane and cocurrent flow arrangement. The system was initially operated at an inlet TMP of 0 psi (inlet seawater feed pressure minus the inlet distillate water pressure) and an exit TMP of 0.5 psi, giving an average TMP of 0.25 psi. For this TMP, the distillate salinity was calculated as being between 248 and 77 ppm. It should be noted that the wide range and apparently high salinity values were a result of the method used to analyze the distillate salinity. Measuring the instantaneous or local distillate salinity of the water vapor as it passed through the membrane was not possible. The method used to determine local salinity involved measuring the salinity of the distillate drained from the distillate tank, which was a mixture of condensed vapor and seawater passing through the membrane and previously present water in the distillate loop, and using this measurement along with a previously derived algebraic rate equation to approximate the local salinity. From FIG. 6, it can be seen that as the TMP was reduced, the improvement in distillate salinity lagged the time-phased (15 minute intervals) reduction in TMP. The method of obtaining the local salinity undoubtedly contributed to this apparent lag in membrane recovery from a flooding condition.

When the average TMP was increased to 1.5 psi, the distillate salinity quickly increased to 275 ppm. A maximum salinity of 940 ppm was measured at the maximum selected TMP of 2.63 psi. From the resultant graph, it was estimated that the water entry pressure was less than 1.5 psi for the high porosity membrane. As the TMP was subsequently reduced, it was noted that the distillate salinity likewise decreased. Approximately 529 ppm water was produced for a TMP of 1.53 psi. This trend continued as the TMP was reduced. It can also be seen from FIG. 6 that the postflood distillate salinity was lower than the preflood distillate salinity. This was significant because it indicated that there was no permanent damage done to the membrane during flooding. In later tests, the membrane produced distillate salinity readings of less than 4 ppm, further indicating that no permanent damage was experienced by the membrane.

Figure 7:
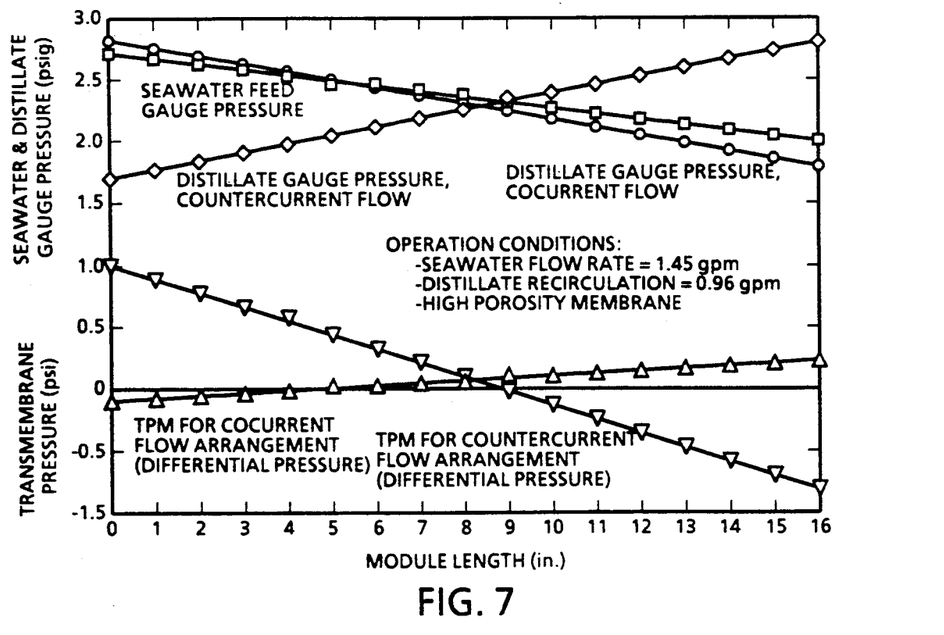
FIG. 7 is a graph of pressure distributions inside the membrane distillation module as a function of length.

Referring now to FIG. 7, it can be seen that employing a countercurrent flow arrangement resulted in a greater absolute value of TMP as alluded to earlier. However, the mathematical average value of TMP over the entire length of the membrane was not much different than for the cocurrent arrangement. Because the flows of the distillate and seawater streams are in opposite directions for a countercurrent arrangement, their associated pressure drops along the module length are likewise in opposite directions. Thus, the transmembrane pressure (TMP) was not constant along the length of the module but varied rather substantially and changed from a positive to a negative value. With cocurrent flow, the pressure drop for each flow stream occurred in the same direction. This produced a TMP that was almost constant with length and which, if desired, could easily be regulated by increasing or decreasing the pressures of one or both of the flow streams, as desired. Consequently a module employing a cocurrent flow arrangement can be made much longer than the module employing a countercurrent arrangement without the water entry pressure being exceeded. The porosity of the membrane must be taken into consideration when designing for the proper transmembrane operating pressure. Since a high porosity membrane has a water entry pressure that is 40% lower than the water entry pressure for a low porosity membrane, the permissible pressure range was more strictly limited. Finally, increasing the flow rate of the distillate or feed seawater streams also affected TMP. Increasing the flow rate of either stream increased the head loss per unit length along the membrane, i.e., magnified the slope of the top three curves on FIG. 7, and, therefore, increased the TMP.

Figure 8:
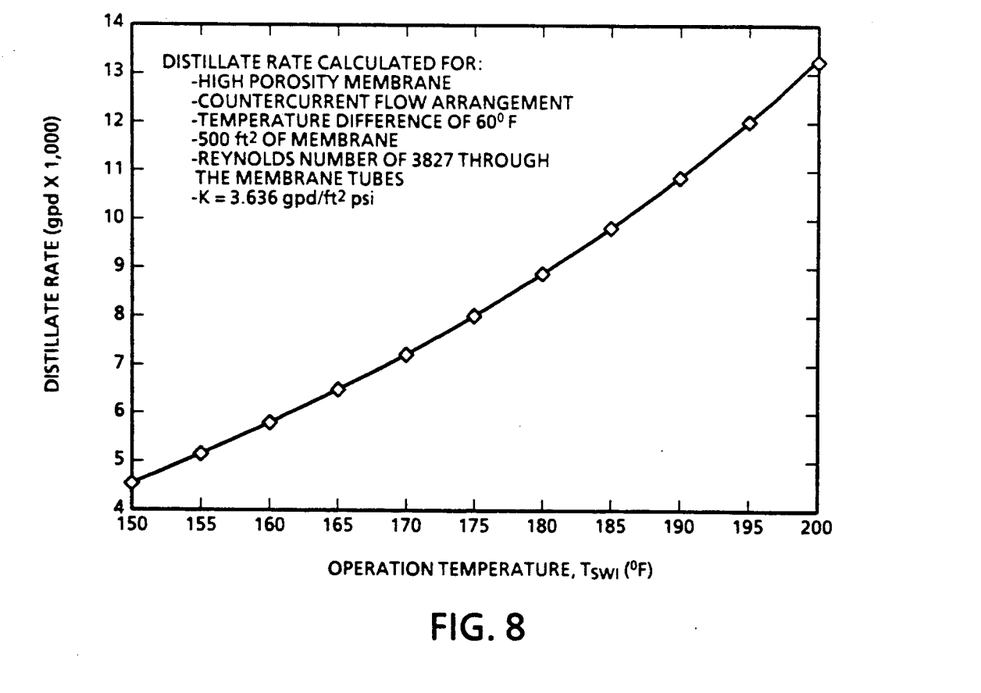
FIG. 8 is a curve showing distillation rates for a full scale plant showing the effects of operating temperature on plant performance.

Referring now to FIG. 8, data are shown for a typical 12,000 gallons (about 45,600 liters) per day. These data are based on an overall mass transfer coefficient of 3.636 gpd/ft$^2$-psi, assuming turbulent flow (high Reynolds number), a counter current flow arrangement and a high porosity membrane. The data was calculated in accordance with Equation (1) and the following additional assumptions: a constant temperature difference between the feed water stream and distillate stream of 60° F. (about 15.5° C.); and, a membrane area of 500 ft$^2$ (about 46 m$^2$).

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. An apparatus for obtaining fresh water from seawater, comprising:
    a membrane distillation module further comprising a shell having a saline inlet port, a saline outlet port, a fresh water inlet port and a fresh water outlet port, said fresh water ports fluidly isolated from said saline ports by at least one tubular porous hydrophobic membrane;
    means for flowing heated seawater through said seawater ports so that said seawater passes the interior surface of said at least one tubular membrane with a flow rate exceeding laminar flow corresponding to a Reynolds number in excess of 1000; and,
    means for flowing fresh water through said fresh water ports so that said fresh water passes over the exterior of said tubular membrane, said fresh water collecting and condensing water vapor that passes through said permeable membranes;

whereby the pressure difference between said fresh water and said seawater is maintained in the range of −2.5 psi to +2.5 psi.

2. A process for obtaining fresh water from seawater, comprising:

passing fresh water along a first surface of a vapor permeable hydrophobic membrane; and passing heated seawater along a second surface of said membrane at a turbulent flow corresponding to a Reynolds number in excess of 1000.

3. A process as claimed in claim 2 wherein said turbulent flow corresponds to a Reynolds number of at least 2000.

4. A process as claimed in claim 2 wherein said turbulent flow corresponds to a Reynolds number in the range of 2000 to 5000.

5. A process as claimed in claim 2 wherein said membrane is expanded porous polytetrafluoroethelene.

6. A process as claimed in claim 5 wherein the maximum membrane pore size is within the range of 2.0 to 3.5 microns.

7. A process as claimed in claim 2 wherein said membrane is tubular.

8. A process as claimed in claim 2 wherein the flow direction of said seawater and said fresh water are in the same direction along opposed surfaces of said membrane.

9. A process as claimed in claim 2 wherein the flow direction of said seawater is opposite the flow direction of said fresh water along opposed surfaces of said membrane.

10. A process as claimed in claims 2 wherein said seawater is heated to a temperature in the range of 150 to 210 degrees F.

11. A process as claimed in claim 10 wherein said seawater is heated to a temperature in the range of 190 to 200 degrees F.

12. An apparatus for obtaining fresh water from seawater, comprising:

a membrane distillation module further comprising a shell having a saline inlet port, a saline outlet port, a fresh water inlet port and a fresh water outlet port, said fresh water ports fluidly isolated from said saline ports by at least one tubular porous hydrophobic membrane having a ratio of length to diameter of about 19;

means for flowing heated seawater through said seawater ports so that said seawater passes the interior surface of said at least one tubular membrane with a flow rate exceeding laminar flow corresponding to a Reynolds number in excess of 1000; and means for flowing fresh water through said fresh water ports so that said fresh water passes over the exterior of said tubular membrane, said fresh water collecting and condensing water vapor that passes through said permeable membrane.

13. A process for obtaining fresh water from seawater, comprising:

passing fresh water along a first surface of a vapor permeable, tubular hydrophobic membrane having a ratio of length to diameter of about 19; and passing heated seawater along a second surface of said membrane at a turbulent flow corresponding to a Reynolds number in excess of 1000.

14. A process for obtaining fresh water from seawater, comprising:

passing fresh water along a first surface of a vapor permeable hydrophobic membrane; and passing heated seawater along a second surface of said membrane at a turbulent flow corresponding to a Reynolds number in excess of 1000;

whereby the pressure difference between said fresh water and said seawater is maintained in the range of −1.0 psi to +1.0 psi.

15. A process as claimed in claim 14 wherein said membrane is tubular.

16. A process as claimed in claim 15 wherein said membrane has a ratio of length to diameter of about 19.

17. An apparatus as claimed in claim 12 wherein the pressure difference between said fresh water and said seawater is maintained in the range of −1.0 psi to +1.0 psi.

18. An apparatus as claimed in claim 12 wherein the pressure difference between said fresh water and said seawater is maintained in the range of −2.5 psi to +2.5 psi.

19. A process as claimed in claim 2 wherein the pressure difference between said fresh water and said seawater is maintained in the range of −2.5 psi to +2.5 psi.

* * * * *